(12) United States Patent
Kim et al.

(10) Patent No.: US 8,369,408 B2
(45) Date of Patent: Feb. 5, 2013

(54) METHOD OF FAST MODE DECISION OF ENHANCEMENT LAYER USING RATE-DISTORTION COST IN SCALABLE VIDEO CODING (SVC) ENCODER AND APPARATUS THEREOF

(75) Inventors: Seontae Kim, Daejeon (KR); Krishna Reddy Konda, Hyderabad (IN); Changsik Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 625 days.

(21) Appl. No.: 12/645,717

(22) Filed: Dec. 23, 2009

(65) Prior Publication Data

US 2010/0158127 A1    Jun. 24, 2010

(30) Foreign Application Priority Data

Dec. 23, 2008    (KR) ........................ 10-2008-0132528

(51) Int. Cl.
*H04N 11/02* (2006.01)
(52) U.S. Cl. ......... 375/240.16; 375/240.01; 375/240.12; 375/240.19
(58) Field of Classification Search .............. 375/240.01, 375/240.19; 382/233; 725/62
See application file for complete search history.

(56) References Cited

U.S. PATENT DOCUMENTS

| | | | | |
|---|---|---|---|---|
| 7,463,683 | B2 * | 12/2008 | Van Der Schaar et al. | 375/240.1 |
| 2005/0265450 | A1 * | 12/2005 | Raveendran et al. | 375/240.15 |
| 2006/0153300 | A1 * | 7/2006 | Wang et al. | 375/240.16 |
| 2006/0193388 | A1 * | 8/2006 | Woods et al. | 375/240.16 |

FOREIGN PATENT DOCUMENTS

| | | |
|---|---|---|
| KR | 10-2007-0045662 | 5/2007 |
| KR | 10-2007-0090273 | 9/2007 |

OTHER PUBLICATIONS

Efficient inter-layer motion compensation for spatially scalable video coding—Rong Zhang; Comer, Mary L. IEEE Transactions on Circuits and Systems for Video Technology 18. 10: 1325-34. IEEE. (Oct. 2008).*
Wavelet-based highly efficient scalable video coding Jiang Shan Zhang; Guang Xi Zhu. Proceedings of the SPIE—The International Society for Optical Engineering 4911: 46-51. SPIE-Int. Soc. Opt. Eng. (2002).*

(Continued)

*Primary Examiner* — William C Vaughn, Jr.
*Assistant Examiner* — Luis M Perez
(74) *Attorney, Agent, or Firm* — Staas & Halsey LLP

(57) ABSTRACT

A method of fast mode decision of an enhancement layer using a bitrate-distortion cost in an SVC encoder includes: calculating a bitrate-distortion cost for a current macro block of an enhancement layer and a bitrate-distortion cost for a previous macro-block of the current macro block of an enhancement layer based on an optimal motion mode and an motion vector for a macro block of a base layer of a current frame; correcting the bitrate-distortion cost for the previous macro block calculated at the calculating by a correction value for reflecting relationship with the previous frame to calculate a final bitrate-distortion cost for the previous macro block; and comparing the bitrate-distortion cost for the current macro block calculated at the calculating with the final bitrate-distortion cost calculated at the correcting and selecting a motion mode that will be removed from the current macro block according to the comparison result.

14 Claims, 8 Drawing Sheets

OTHER PUBLICATIONS

Simplified motion-refined scheme for fine-granularity scalability Yih Han Tan; Zhengguo Li; Keng Pang Lim; Rahardja, Susanto. IEEE Transactions on Circuits and Systems for Video Technology 18. 9: 1212-22. IEEE. (Sep. 2008).*

Hung-Chih Lin et al., "Layer-Adaptive Mode Decision and Motion Search for Scalable Video Coding With Combined Coarse Granular Scalability (CGS) and Temporal Scalability", ICIP 2007, pp. 289-292.

He Li et al., "Fast Mode Decision Algorithm for Inter-Frame Coding in Fully Scalable Video Coding", IEEE Transactions on Circuits and Systems for Video Technology, vol. 16, No. 7, Jul. 2006, pp. 889-895.

* cited by examiner

Mode 16 x 16

Mode 8 x 16

Mode 16 x 8

Mode 8 x 8

| MODE | MACRO BLOCK MODE | OCCUPATION RATE | MODE | SUB BLOCK MODE | OCCUPATION RATE |
|---|---|---|---|---|---|
| 0 | SKIP | 0.003 | 0 | DirectMode | 0.0007 |
| 1 | Mode 16 x 16 | 2.2 | 8 | BlockMode 8 x 8 | 0.08 |
| 2 | Mode 16 x 8 | 4.3 | 9 | BlockMode 8 x 4 | 17.1 |
| 3 | Mode 8 x 16 | 4.3 | 10 | BlockMode 4 x 8 | 17.1 |
| 4 | Mode 8 x 8 | 77.4 | 11 | BlockMode 4 x 4 | 34.6 |

FIG. 8A

CASE OF RDCost > RDCost$_{BLSKIP}$

| BASE LAYER \ ENHANCEMENT LAYER | Mode16x8/Mode8x16 | Mode 8x8 |
|---|---|---|
| Mode 16 x 16 | ○ | |
| Mode 16 x 8 Mode 8 x 16 | ○ | |
| Mode 8 x 8 | | |

FIG. 8B

CASE OF RDCost < RDCost$_{BLSKIP}$

| BASE LAYER \ ENHANCEMENT LAYER | Mode16x8/Mode8x16 | Mode 8x8 |
|---|---|---|
| Mode 16 x 16 | | |
| Mode 16 x 8 Mode 8 x 16 | | ○ |
| Mode 8 x 8 | | ○ |

METHOD OF FAST MODE DECISION OF ENHANCEMENT LAYER USING RATE-DISTORTION COST IN SCALABLE VIDEO CODING (SVC) ENCODER AND APPARATUS THEREOF

RELATED APPLICATIONS

The present application claims priority to Korean Patent Application Serial Number 10-2008-0132528, filed on Dec. 23, 2008, the entirety of which is hereby incorporated by reference.

BACKGROUND OF THE INVENTION

1. Field of the Invention

The present invention relates to a method of fast mode decision of an enhancement layer using rate-distortion cost (RD cost) in an SVC encoder and an apparatus thereof, and in particular, to a method of fast mode decision of an enhancement layer using rate-distortion cost in an Scalable Video Coding (SVC) encoder capable of fast determining motion prediction in an enhancement layer without deteriorating image quality using a bitrate-distortion cost of a lower layer and a bitrate-distortion cost of a previous frame to perform fast video encoding and an apparatus thereof.

2. Description of the Related Art

In general, due to uncompressed digital data having a very large size, frame signals to be transmitted and stored need to be compressed. In other words, in order to minimize a bandwidth required to transmit digitally encoded video data, a video compression algorithm is applied to the digitally encoded video data.

A video compression technology according to the related art compresses a large capacity of video data under the assumption it is within a predetermined network bandwidth due to a limited operation environment of hardware, which does not consider a flexible network environment.

Therefore, in order to compress the video data to be used under the network environment where the bandwidth frequently varies, a new compression technology is needed. A scalable video codec algorithm was developed in order to solve the above problem.

However, the scalable video codec, which is an extended codec based on the currently and widely used H.264 (MPEG-4 AVC), provides three scalabilities associated with spatial, temporal, and image quality aspects, the complexity is significantly increased accordingly. Therefore, the complexity should be lowered in order to be applicable for various platform terminals or service applications.

As a result, the scalable video codec providing three scalabilities based on the complex algorithm of H.264 essentially performs a significantly complex operation as compared to H.264. The complex video codec cannot perform fast encoding at the user desired rate upon processing general video signals. Therefore, a method for effectively and fast encoding an algorithm without deteriorating image quality should be researched.

SUMMARY OF THE INVENTION

It is an object of the present invention to provide a method of fast mode decision of an enhancement layer using a bitrate-distortion cost in an SVC encoder capable of performing fast encoding by removing motion modes unnecessary for a current macro block of an enhancement layer using motion detection information of a lower layer and motion detection information of a previous frame without affecting a scalable video codec having high complexity due to the deterioration of a frame or the increase in bitrate and an apparatus thereof.

Further, the present invention can be used for many platform terminals or service applications because a method of fast mode decision of an enhancement layer uses a bitrate-distortion cost (RD cost) in an SVC encoder.

In order to achieve the above objects, there is provided a method of fast mode decision of an enhancement layer using a bitrate-distortion cost in an SVC encoder according to an embodiment of the present invention, including: a first step of calculating a bitrate-distortion cost for a current macro block and a bitrate-distortion cost for a previous macro-block of the current macro block of the enhancement layer based on an optimal motion mode and a motion vector for a macro block of a base layer of a current frame; a second step of correcting the bitrate-distortion cost for the previous macro block calculated at the first step by a correction value for reflecting relationship with the previous frame to calculate a final bitrate-distortion cost for the previous macro block; and a third step of comparing the bitrate-distortion cost for the current macro block calculated at the first step with the final bitrate-distortion cost calculated at the second step and selecting motion modes that will be removed from the current macro block according to the comparison result.

Preferably, the second step includes: b-1) calculating a first correction value obtained by averaging the bitrate-distortion costs for all the macro blocks of the enhancement layer derived based on the motion modes and motion vectors for the macro block of the base layer of the previous frame; b-2) calculating a second correction value obtained by averaging the bitrate-distortion costs derived based on the optimal motion mode and motion vector for the macro block of the enhancement layer of the previous frame; and c) calculating the final bitrate-distortion cost based on the bitrate-distortion cost for the previous macro block calculated at the first step and the first correction value and the second correction value calculated at steps b-1) and b-2).

Preferably, step c) includes: c-1) calculating the correction values from an absolute value of the difference between the first correction value calculated at step b-1) and a second correction value calculated at step b-2); and c-2) summing the bitrate-distortion cost for the current macro block calculated at the first step and the correction value calculated at step c-1) to calculate the final bitrate-distortion cost.

Preferably, the final bitrate-distortion cost at step c-2) varies depending on a speed parameter K to determine the deterioration of image quality and the increase in bitrate during a processing time.

Preferably, the third step selects the motion modes that will be removed from the macro block of the enhancement layer of the current frame according to the optimal motion mode for the macro block of the base layer of the current frame.

Preferably, the motion modes of each macro block include at least one of a skip mode, which is a first mode, Mode 16×16, which is a second mode, Mode 16×8 or Mode 8×16, which is a third mode, and Mode 8×8, which is a fourth mode, the method further including, prior to the first step, first performing the first mode and the second mode because the time occupation rate of the first mode and the second mode among the motion modes for the current macro block of the enhancement layer based on the motion modes and motion vectors for the optimal macro block of the base layer of the current frame depend on FIG. 3.

Preferably, the motion modes of each macro block include an inter mode that performs the compression based on the relationship between the current frame and the previous frame and an intra mode that performs the compression based on the relationship within the current frame, the method further including, after the third step, performing the intra mode for the current macro block of the enhancement layer of the current frame.

Preferably, the motion modes of each macro block include at least one of the skip mode, which is a first mode, Mode 16×16, which is a second mode, Mode 16×8 or Mode 8×16, which is a third mode, and Mode 8×8, which is a fourth mode.

Preferably, the third step performs the third mode of the motion modes for the current macro block of the enhancement layer of the current frame if the optimal motion mode for the macro block of the base layer of the current frame is the first mode and the bitrate-distortion cost for the current macro block calculated at the first step is larger than or equal to the final bitrate-distortion cost calculated at the second step.

Preferably, the third step performs the third mode of the motion modes for the current macro block of the enhancement layer of the current frame if the optimal motion mode for the macro block of the base layer of the current frame is the second mode and the bitrate-distortion cost for the current macro block calculated at the first step is larger than or equal to the final bitrate-distortion cost calculated at the second step.

Preferably, the third step performs modes except for the third mode and the fourth mode of the motion modes for the current macro block of the enhancement layer of the current frame if the optimal motion mode for the macro block of the base layer of the current frame is the third mode and the bitrate-distortion cost for the current macro block calculated at the first step is larger than or equal to the final bitrate-distortion cost calculated at the second step.

Preferably, the third step performs the third mode of the motion modes for the current macro block of the enhancement layer of the current frame if the optimal motion mode for the macro block of the base layer of the current frame is the first mode and the bitrate-distortion cost for the current macro block calculated at the first step is less than or equal to the final bitrate-distortion cost calculated at the second step.

Preferably, the third step performs the fourth mode of the motion modes for the current macro block of the enhancement layer of the current frame if the optimal motion mode for the macro block of the base layer of the current frame is the second mode and the bitrate-distortion cost for the current macro block calculated at the first step is less than or equal to the final bitrate-distortion cost calculated at the second step.

Preferably, the third step performs the fourth mode of the motion modes for the current macro block of the enhancement layer of the current frame if the optimal motion mode for the macro block of the base layer of the current frame is the third mode and the bitrate-distortion cost for the current macro block calculated at the first step is less than or equal to the final bitrate-distortion cost calculated at the second step.

In addition, an apparatus of fast mode decision of an enhancement layer using a bitrate-distortion cost in an SVC encoder is an apparatus for encoding SVC. The apparatus for SVC includes: a first motion detector that performs motion detection for a base layer of a current frame and thus, detects an optimal motion mode and a motion vector for a macro block of the base layer of the current frame; and a second motion detector that performs the motion prediction for a current macro block of an enhancement layer based on the optimal motion mode and motion vector for the macro block of the base layer of the current frame detected in the first motion detector.

Preferably, the second motion detector calculates a bitrate-distortion cost for a current macro block and a bitrate-distortion cost for a previous macro block of the current macro block of the enhancement layer based on an optimal motion mode and a motion vector for a macro block of a base layer of a current frame detected in the first motion detector; corrects the bitrate-distortion cost for the previous macro block by a correction value for reflecting relationship with the previous frame to calculate a final bitrate-distortion cost for the previous macro block; and compares the bitrate-distortion cost for the current macro block with the final bitrate-distortion cost and selects motion modes that will be removed from the current macro block according to the comparison result Preferably, the second motion detector calculates a first correction value obtained by averaging the bitrate-distortion costs for all the macro blocks of the enhancement layer derived based on the motion modes and motion vectors for the macro block of the base layer of the previous frame; calculates a second correction value obtained by averaging the bitrate-distortion costs derived based on the optimal motion mode and motion vector for the macro block of the enhancement layer of the previous frame; and calculates the final bitrate-distortion cost based on the bitrate-distortion cost for the previous macro block of the current frame and the first correction value and the second correction value, when calculating the final bitrate-distortion cost for the previous macro block.

Preferably, the second motion detector calculates the correction value from an absolute value of the difference between first correction value and the second correction value and sums the bitrate-distortion cost for the current macro block of the current frame and the correction value to calculate the final bitrate-distortion cost, when calculating the final bitrate-distortion cost based on the bitrate-distortion cost for the previous macro block of the current frame and the first correction value and the second correction value.

Preferably, the second motion detector calculates the final bitrate-distortion cost in proportion to a speed parameter K to determine the deterioration of image quality and the increase in bitrate over processing time when calculating the final bitrate-distortion cost.

Preferably, the second motion detector selects the motion modes that will be selectively removed from the macro block of the enhancement layer of the current frame according to the optimal motion mode for the macro block of the base layer of the current frame.

Preferably, the motion modes of each macro block include at least one of a skip mode, which is a first mode, Mode 16×16, which is a second mode, Mode 16×8 or Mode 8×16, which is a third mode, and Mode 8×8, which is a fourth mode.

With the present invention, the motion information of the lower layer of the current frame and the motion information of the enhancement layer of the previous frame are effectively extracted from the scalable video codec having a multilayer structure, such that many motion modes to be performed in the enhancement layer are removed, making it possible to obtain the fast encoding performance speed.

The present invention can be applied to more platforms by obtaining the fast encoding performance speed and can be applied for many fields.

BRIEF DESCRIPTION OF THE DRAWINGS

FIGS. 8A and 8B are tables showing motion modes to be performed according to a bitrate-distortion cost.

DETAILED DESCRIPTION OF THE PREFERRED EMBODIMENTS

Figure 1:
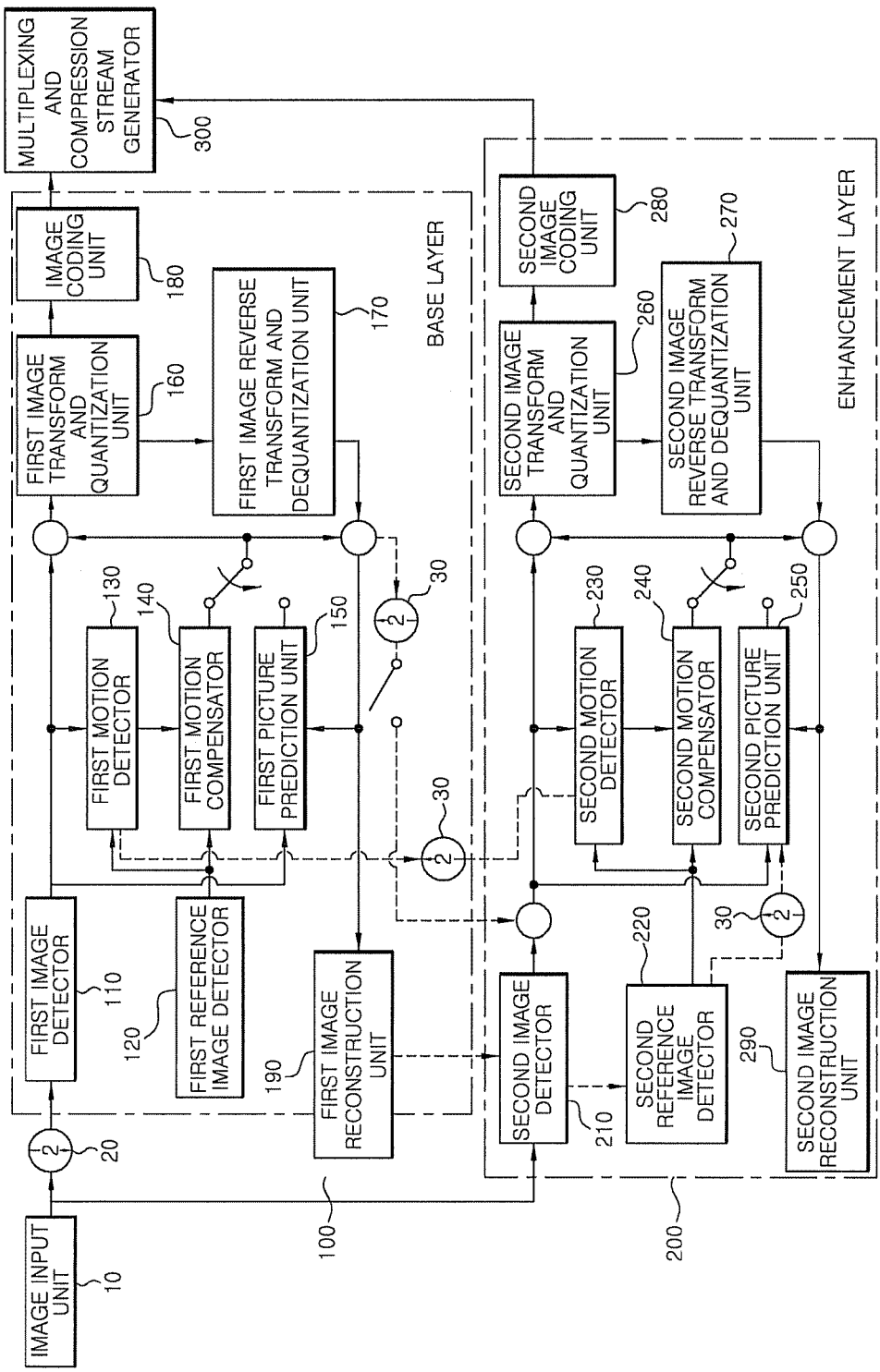
FIG. 1 is a block diagram showing a configuration of a two-layer assisting spatial scalable video encoding apparatus according to an embodiment of the present invention.

Hereinafter, exemplary embodiments of the present invention will be described with reference to the accompanying drawings. Herein, the detailed description of a related known function or configuration that may make the purpose of the present invention unnecessarily ambiguous in describing the present invention will be omitted. Exemplary embodiments of the present invention are provided so that those skilled in the art may more completely understand the present invention. Accordingly, the shape, the size, etc., of elements in the drawings may be exaggerated for explicit comprehension.

FIG. 1 is a block diagram showing a configuration of a scalable video encoding apparatus according to an embodiment of the present invention. The scalable video encoding apparatus according to the present invention is configured of a multi-layer structure having an enhancement layer and a lower layer that provide various bit streams applicable to several network situations. The present invention will describe, by way of example, a case that has two layers that assists spatial and temporal scalable functions.

The present invention is configured of a base layer (hereinafter, a lower layer is collectively referred to as a base layer) that compresses and processes video data using an H.264 compression algorithm and an enhancement layer (hereinafter, an upper layer is collectively referred to as an enhancement layer) that increases compression efficiency using encoding information of the base layer). Generally, when generating the compression stream using a scalable video codec, frame compression is first performed in the base layer, for example, using MPEG-2 or MPEG-4 international standards. Thereafter, the frame compression is performed in the enhancement layer based on motion vector information of the frame compressed in the base layer.

Referring to FIG. 1, the scalable encoding apparatus according to an embodiment of the present invention is a configuration that compresses the frame of the base layer. The scalable video encoding apparatus includes a image input unit 10, a down sampler 20, a first image detector 110, a first reference image detector 120, a first motion detector 130, a first motion compensator 140, a first picture prediction unit 150, a first image transform and quantization unit 160, a first image reverse transform and dequantization unit 170, a image coding unit 180, and a first image reconstruction unit 190.

The configuration for compressing the frame of the enhancement layer is configured to include an up sampler 30, a second image detector 210, a second reference image detector 220, a second motion detector 230, a second motion compensator 240, a second picture prediction unit 250, a second image transform and quantization unit 260, a second image reverse transform and dequantization unit 270, a image coding unit 280, a second image reconstruction unit 290, and a multiplexing and compression stream generator 300.

The scalable encoding apparatus according to the embodiment of the present invention down-samples an original frame two times by the down sampler 20 for spatial scalability and then uses it as a current frame of the base layer, since a size of the original frame input through the image input unit 10 is input at a size of the enhancement layer when the frame of the base layer is compressed. The first image detector 110 extracts the current frame and the first reference image detector 120 extracts a reference frame that means the frame before and after the current frame for the base layer. The first picture prediction unit 150 determines optimal motion modes through intra-picture prediction using only the current frame like a general video compression technology and performs the compression. Even though the determination of the optimal motion mode will not be described in more detail, those skilled in the art can be easily understood through a known technology.

The first motion detector 130 performs the motion detection using the reference frame, this means the current frame and the frame before and after the current frame, and the first motion compensator 140 performs inter-picture compression scheme by performing the motion compensation on the motion detection using the reference frame. In this way, the first motion detector 130 and the first motion compensator 140 determines the optimal motion mode and performs compression.

When the optimal motion mode of the base layer is determined, the first image transform and quantization unit 160 performs the compression at the expense of the loss of original data through discrete cosine transform (DCT) and quantization. In addition, the image coding unit 180 performs entropy coding, etc., using a probabilistic statistics in order to perform efficient compression. In addition, in order to generate the reconstruction image, the first image reverse transform and dequantization unit 170 performs dequantization and reverse transform. Then, the first image reconstruction unit 190 generates a reconstruction image. The reconstruction image is again used for intra-picture prediction, motion detection, or motion compensation.

The scalable video encoding apparatus according to the embodiment of the present invention uses all the algorithms that were used in the base layer, each corresponding to the base layer in the case of the frame compression of the enhancement layer and further increases the compression efficiency by using information coming from the base layer once more. In other words, when using the motion vector coming from the base layer as the motion vector of the enhancement layer by using the two-fold up sampling 30, if the deterioration of image quality does not occur, the motion vector is used and even in the case when a frame remains, the compression efficiency is increased by using the same method. Finally, the multiplexing and compression stream generator 300 integrates the compression stream on image performed in this way to generate the compression stream. The technology relating to the frame compression of the enhancement layer can be derived from known matters by those skilled in the art.

However, the second motion detector 230 applies a fast encoding method of the enhancement layer using a bitrate-distortion cost in the SVC according to the embodiment of the present invention as described below. In other words, the second motion detector 230 determines the motion mode for a macro block of the enhancement layer using the motion modes and motion vectors for the corresponding macro block calculated through the motion detection in the first motion detector 130 to increase compression efficiency.

Therefore, the second motion detector 230 performs the motion detection for the current macro block of the enhancement layer based on the optimal motion mode and motion vector for the macro block of the base layer of the current frame detected in the first motion detector 130.

Herein, the second motion detector 230 calculates a bitrate-distortion cost for a current macro block and a bitrate-distortion cost for a previous macro block of the current macro block of the enhancement layer based on an optimal motion mode and a motion vector for a macro block of a base layer of a current frame detected in the first motion detector 130; corrects the bitrate-distortion cost for the previous macro block by a correction value for reflecting relationship with the previous frame to calculate a final bitrate-distortion cost for the previous macro block; and a third step of comparing the bitrate-distortion cost for the current macro block with the final bitrate-distortion cost calculated at the second step and selects motion modes that will be removed from the current macro block according to the comparison result.

Preferably, the second motion detector 230 calculates a first correction value obtained by averaging the bitrate-distortion costs for all the macro blocks of the enhancement layer derived based on the motion modes and motion vectors for the macro block of the base layer of the previous frame, calculates a second correction value obtained by averaging the bitrate-distortion costs derived based on the optimal motion mode and motion vector for the macro block of the enhancement layer of the previous frame, and calculates the final bitrate-distortion cost based on the bitrate-distortion cost for the previous macro block of the current frame and the first correction value and the second correction value, when calculating the final bitrate-distortion cost for the previous macro block.

Herein, the second motion detector 230 calculates the correction value from an absolute value of the difference between first correction value and the second correction value and sums the bitrate-distortion cost for the current macro block of the current frame and the correction value to calculate the final bitrate-distortion cost, when calculating the final bitrate-distortion cost based on the bitrate-distortion cost for the previous macro block of the current frame and the first correction value and the second correction value.

In addition, the second motion detector 230 calculates the final bitrate-distortion cost in proportion to a speed parameter K to determine the deterioration of frame quality and the increase in bitrate-distortion cost during the processing time when calculating the final bitrate-distortion cost.

Herein, the second motion detector 230 selects the motion modes that will be selectively removed from the macro block of the enhancement layer of the current frame according to the optimal motion mode for the macro block of the base layer of the current frame. The detailed description of the determination and selection of the motion mode that is performed in the second motion detector 230 will be described below.

Herein, the first motion detector 130 and the second motion detector 230 uses seven kinds of motion compensation block sizes, for example, H.264 having a single layer. The embodiment thereof will be described with reference to FIGS. 2A and 2B.

Figure 2A:
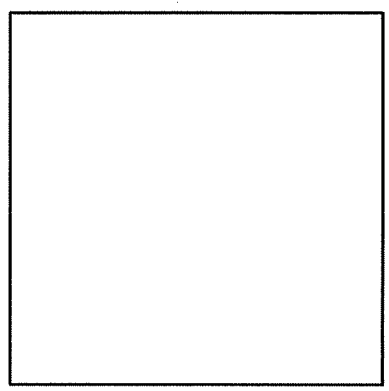
FIG. 2A is an exemplary diagram showing a size of a macro block used for the present invention.
Figure 2A:
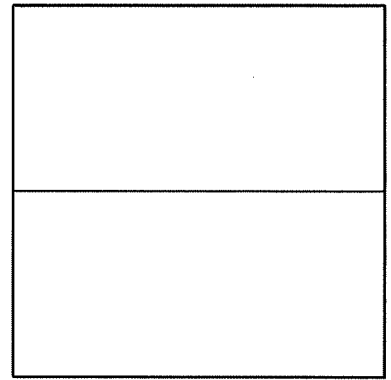
Figure 2A:
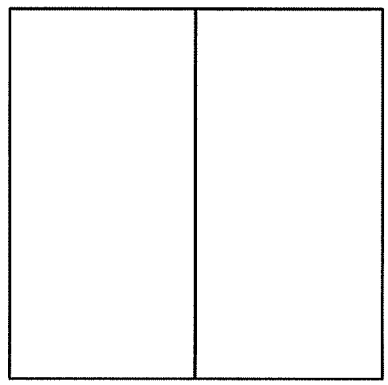
Figure 2A:
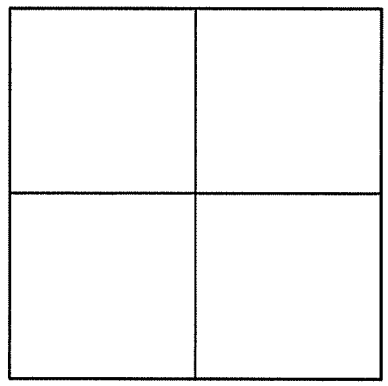
Figures 2B, 3:
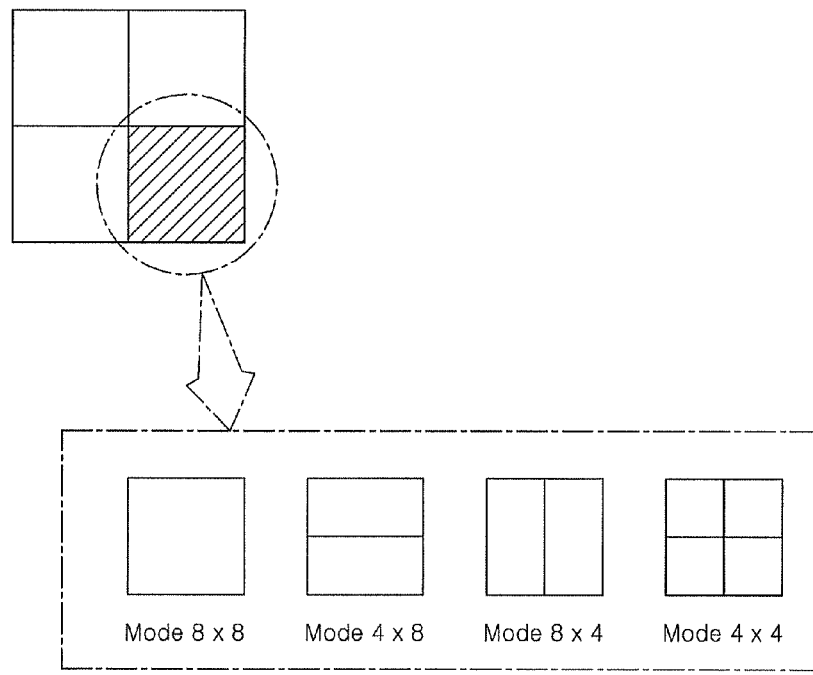
FIG. 2B is an exemplary diagram showing a size of a sub block of a macro block used for the present invention.
FIG. 3 is experimental data showing a time rate occupied by each motion mode while motion modes of the macro block and motion modes of the sub-macro block are performed.

FIG. 2A shows a size of a macro block used for the present invention and FIG. 2B shows a size of a sub block of a macro block used for the present invention.

Referring to FIGS. 2A and 2B, the macro block (MB) can have sizes of 16×16, 8×16, 16×8, and 8×8 according to each mode. Further, the macro block having a size of 8×8 can include a sub block (SB) having sizes of 8×4, 4×8, and 4×4. Therefore, the first motion detector and the second motion detector use the macro block and the sub block having seven kinds of sizes to perform the motion compensation of the base layer and the enhancement layer.

At this time, the motion modes are classified according to the size of each macro block and sub block.

Meanwhile, in the case of the motion prediction mode, there are a total of five motion modes which include Mode 16×16, Mode 8×16, Mode 16×8, and Mode 8×8, and are motion modes according to the size of the macro block and a skip mode, that is, the motion modes of the macro block.

In addition, in the case of Mode 8×8 in the motion mode of the macro block, there is Mode 8×8, which means a total of five motion modes including Mode 8×4, Mode 4×8, and Mode 4×4, which are the motion modes having the size of the sub block and a direct mode, that is, the motion mode of the sub block.

Generally, in compressing the frame using the scalable encoding apparatus, time used in the motion detection is about 97.7%, which occupies the considerable portion. In other words, it can be derived that the considerable portions of the video encoding are used to determine the motion mode. This can be appreciated through the experimental data of FIG. 3.

FIG. 3 is experimental data showing a time rate occupied by each motion mode while the motion modes of the macro block and the motion modes of the sub-macro block are performed;

The skip mode or the direct mode of the motion modes copy the frame found by the predicted motion vector in the base layer as it is. Therefore, the skip mode or the direct mode has low calculation as compared to other modes and the time occupation rate is low accordingly.

Moreover, other motion modes except for the skip mode or the direct mode detect the optimal motion vector having the lowest deterioration of the frame image quality within the search range according to the block size of each mode and determine the optimal mode by being linked with the allocated bit rate. At this time, the used one is the bitrate-distortion cost and the optimal mode is determined in consideration of the allocated bitrate and the image quality of the frame.

The present invention is configured of a multi layer unlike the general video codec having a single layer and all the information of the base layer is provided when encoding the enhancement layer, the present invention uses the motion vector of the base layer to determine the motion mode in the enhancement layer, thereby minimizing the time consumed to compress the frame.

In other words, considering the time occupation time of each motion mode, it can be confirmed that as the block size becomes smaller, the complexity becomes higher. Therefore, the present invention has higher complexity than the motion mode having the low time occupation rate and the large block size and determines the motion mode using the bitrate-distortion cost for the mode having the small block size, thereby minimizing the time consumed to compress the frame.

Therefore, in order to obtain the motion vector for one macro block in the base layer, a total of 10 motion modes each should be performed and in the case of the enhancement layer, a base layer skip flag is checked according to the motion vector or the remaining frame obtained in the base layer to further perform the motion detection.

Herein, the process of obtaining the bitrate-distortion cost to determine the motion mode searches it for each pixel within the motion search range for each motion mode to find an optimal sum of absolute difference (SAD) or a sum of square difference (SSD). The pixel found by this way is set as the optimal motion vector of the mode. When compressing the final SSD or SAD value coming from each mode and the motion vector or the remaining frame, the process of calculating the consumed amount of bit, selecting the optimal bitrate-distortion cost, and determining the motion mode and motion vector should be performed.

As such, when encoding the video frame having the single layer, the encoding speed is improved by mainly using the information in the previous macro block or the previous frame, but in the case of encoding the scalable video frame, since the optimal motion mode in the base layer and the corresponding bitrate-distortion cost are previously known and the bitrate-distortion cost for the previous frame is known when performing the encoding in the enhancement layer, the encoding is performed using it, making it possible to perform fast encoding without deteriorating image quality.

In other words, in the present invention, since the correlation between the bitrate-distortion cost of the current macro block and the bitrate-distortion cost of the previous macro block is high, the motion mode unnecessary to determine the motion mode of the current macro block of the enhancement layer is removed using two values, thereby minimizing the time consumed to perform the frame compression.

Hereinafter, the fast encoding method of the enhancement layer using the bitrate-distortion cost in the scalable vide coding according to the embodiment of the present invention will be described as follows. In description, it is assumed that the information of the basic motion mode and motion vector is brought from the base layer of the current macro block.

Figure 4:
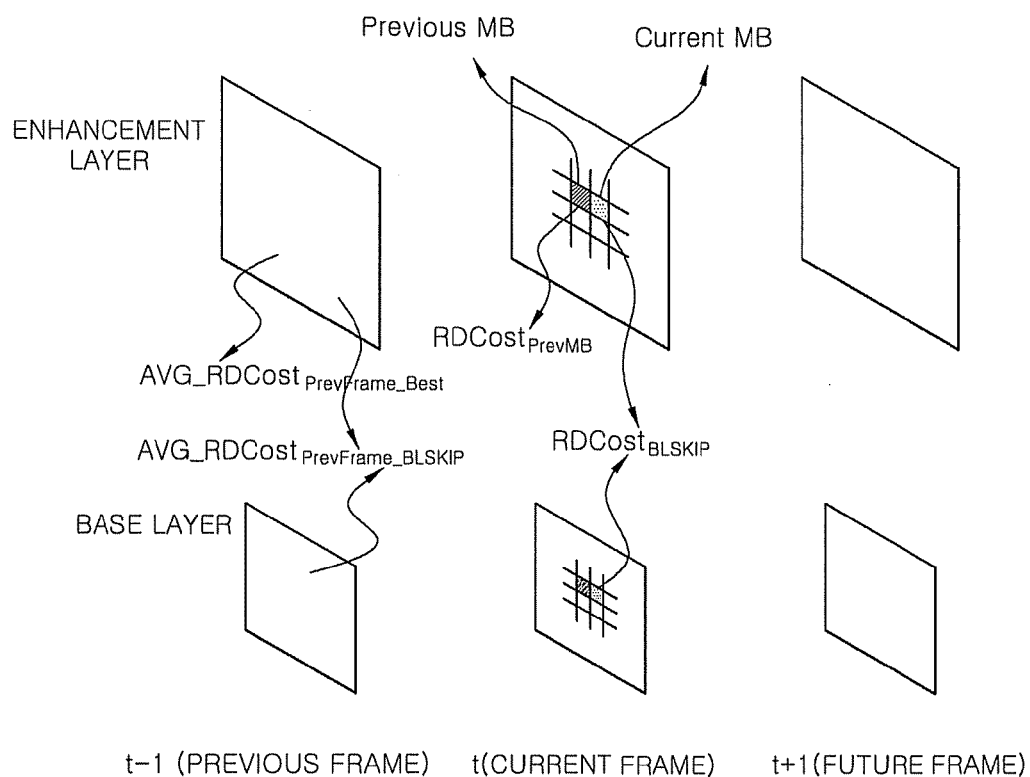
FIG. 4 is a conceptual diagram showing bitrate-distortion cost (RD cost) when the spatial scalability is provided.

FIG. 4 is a conceptual diagram showing bitrate-distortion cost (RD cost) when the spatial scalability is provided. In FIG. 4, when providing the spatial scalability in the present invention, the basically used various bitrate-distortion cost can be appreciated. Herein, t represents an input sequence of the frame, t−1 represents a past frame (hereinafter, collectively referred to previous frame), t+1 represents a future frame.

Referring to FIG. 4, the present invention applies the motion mode and motion vector for the macro block as it is when the optimal motion mode for the macro block of the current frame t in the base layer is known, making it possible to calculate the bitrate-distortion cost for the current macro block (MB) of the enhancement layer.

When the optimal motion mode for the macro block at the current frame t of the base layer is known, the motion mode and motion vector are applied as they are, making it possible to easily calculate the optimal bitrate-distortion cost coming from the determination in the previous macro block (MB) of the enhancement layer.

In other words, the present invention compares the bitrate-distortion cost (for example, $RDCost_{BLSKIP}$) for the current macro block (MB) and the optimal bitrate-distortion cost (for example, $RDCost_{PrevMB}$) for the previous macro block (previous MB) of the enhancement layer and determines the motion mode that will be removed from the macro block of the enhancement layer according to the comparison result.

Moreover, in determining the motion mode that will be removed in the enhancement layer, it is preferable to differentially apply it according to the optimal motion mode in the base layer.

In addition, in order to provide more adaptability using the fact that the previous frame is similar to the current frame, it is preferable that the present invention corrects the bitrate-distortion cost for the previous macro block (previous MB) by the correction value to reflect the relationship with the previous frame t−1 and applies it. In other words, the final bitrate-distortion cost for the previous macro block (previous MB) corrected by the correction value to reflect the relationship with the previous frame t−1 to the bitrate-distortion cost for the previous macro block is calculated, the bitrate-distortion cost and the final bitrate-distortion cost for the current macro block (MB) of the enhancement layer are compared with each other, and the motion mode that will be removed from the macro block of the enhancement layer according to the comparison result is determined.

Herein, it is preferable that the correction value includes a value (for example, $AVG\_RDCost_{PrevFrame\_Best}$) obtained by averaging the bitrate-distortion cost determined in the optimal motion mode of all the macro blocks coming from the previous frame t−1 and a value (for example, $AVG\_RDCost_{PrevFrame\_BLSKIP}$) obtained by averaging the bitrate-distortion cost performed according to the optimal motion mode in the base layer.

Moreover, it is preferable that the correction value is calculated by comparing the foregoing correction values according to the speed parameter K. Herein, the speed parameter K is a factor that exchanges the processing time by saving the encoder and the deterioration of image quality and increase the bitrate. The detailed description thereof will be again described below.

Hereinafter, the fast encoding method of the enhancement layer using the bitrate-distortion cost in the SVC according to the embodiment of the present invention will be described in more detail.

Figure 5:
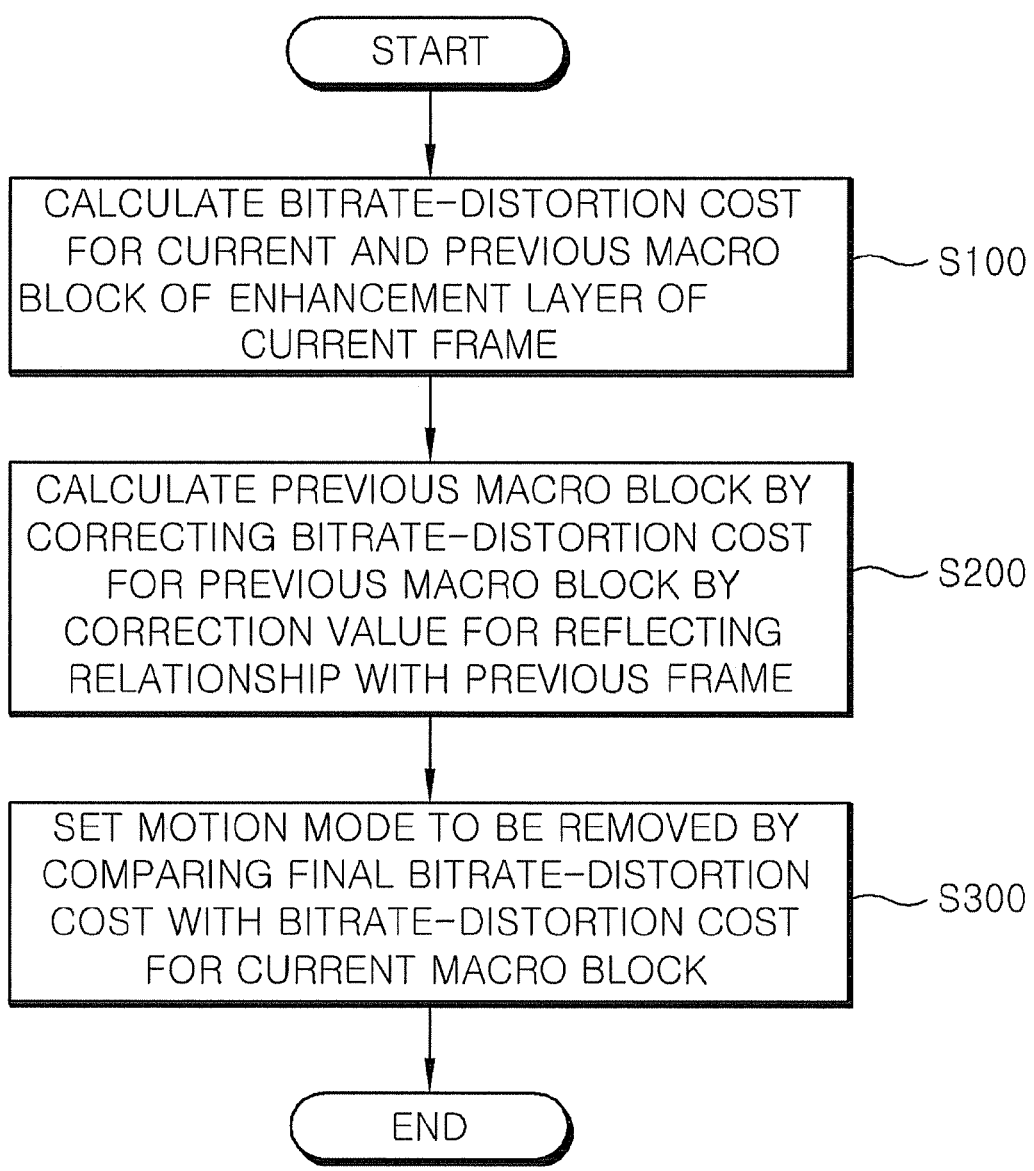
FIG. 5 is a flowchart showing a method of fast mode decision of an enhancement layer using rate-distortion cost in an SVC encoder according to an embodiment of the present invention.

FIG. 5 is a flowchart showing the method of fast mode decision of the enhancement layer using rate-distortion cost in an SVC encoder according to an embodiment of the present invention.

Referring to FIG. 5, the method of fast mode decision of the enhancement layer using the bitrate-distortion cost in an SVC encoder according to an embodiment of the present invention is configured including the following processes.

First, a first step calculates the bitrate-distortion cost for the current macro block of the enhancement layer and the bitrate-distortion cost for the previous macro block of the current macro block based on the motion mode and motion vector for the macro block of the base layer of the current frame (S100). Herein, the bitrate-distortion costs for the current macro block and the previous macro block of the enhancement layer in the current frame t are calculated based on the optimal motion mode and motion vector of the base layer of the current frame t. In other words, the bitrate-distortion cost is obtained by applying the optimal motion mode and motion vector for the current macro block of the base layer in the current frame t to the enhancement layer. Then, the relative value for performing the comparison causes the bitrate-distortion cost corresponding to the optimal motion mode obtained in the previous macro block based on the current macro block.

Next, a second step performs the correction by the correction value for reflecting the relationship with the previous frame t−1 on the bitrate-distortion cost for the previous macro block of the corresponding macro block of the current frame, thereby calculating the final bitrate for the previous macro block (S200).

Herein, it is preferable that the correction value includes a value (hereinafter, considered as the same one as correction value 1) obtained by averaging the bitrate-distortion cost determined in the optimal motion mode of all the macro blocks coming from the previous frame t−1 and a value (hereinafter, considered as the same one as correction value 2) obtained by averaging the bitrate-distortion cost performed according to the optimal motion mode of the base layer in the previous frame t−1.

Further, it is preferable that the correction value is calculated by comparing the foregoing first correction value and the second correction value according to the speed parameter K having a predetermined value. Herein, the speed parameter K is a factor that exchanges the processing time saving of the encoder and the deterioration of image quality and the increase in bitrate. In other words, the value (first correction value) obtained by averaging the bitrate-distortion cost is obtained by applying all the macro blocks having the motion mode and motion vector obtained in the base layer of the previous frame t−1 to the enhancement layer as it is. Thereafter, the value (second correction value) obtained by averaging the bitrate-distortion cost is calculated by the motion mode and motion vector optimally determined in the enhancement layer of the previous frame t−1 and the correction value is calculated by comparing the first correction value and the second correction value according to the speed parameter K.

Herein, it is preferable that a case where the final bitrate-distortion cost for the previous macro block is calculated by performing the correction by the correction value to reflect the correction value, that is, reflect the relationship between the bitrate-distortion cost for the previous macro block and the previous frame t−1 uses the following Equations 1 and 2. Of course, the method for calculating the correction value of the present invention is not limited thereto and when reflecting the relationship with the previous frame, the method can vary as needed.

$$AvgRDCost_{prev} = ABS(AVG\_RDCost_{PrevFrame\_BLSKIP} - AVG\_RDCost_{PrevFrame\_Best})$$ [Equation 1]

$$RDCost = RDCost_{PrevMB} + K \cdot AvgRDCost_{prev}$$ [Equation 2]

In Equation 1, $AVG\_RDCost_{prevFrame\_Best}$ is a value (correction value 1) obtained by averaging the bitrate-distortion cost determined in the optimal motion mode of all the macro blocks coming from the previous frame, $AVG\_RDCost_{PrevFrame\_BLSKIP}$ is a value (correction value 2) obtained by averaging the bitrate-distortion cost performed according to the optimal motion mode in the base layer, and $AvgRDCost_{prev}$, which is the correction value, is calculated by taking the absolute of the difference between the first correction value and the second correction value.

In Equation 2, $RDCost_{PrevMB}$ is the optimal bitrate-distortion cost for the previous macro block, the speed parameter K is a factor that exchanges the processing time saving of the encoder and the deterioration of image quality and the increase in bitrate, and RDCost is the final bitrate-distortion cost reflecting the correction value.

Finally, a third step compares the bitrate-distortion cost for the current macro block and the final bitrate-distortion cost of the calculated current frame t and selects the motion mode that will be removed from the enhancement layer of the current macro block of the current frame t according to the comparison result.

In other words, the bitrate-distortion cost (RDCost) obtained from the following Equation 2 and the bitrate-distortion cost ($RDCost_{BLSKIP}$) for the foregoing current macro block are compared, thereby removing the unnecessary motion mode according to each motion mode of the macro block.

Herein, the motion mode of each macro block is classified into a first mode, a second mode, a third mode, and a fourth mode according to the size of the macro block. For example, the first mode is a skip mode, the second mode is a Mode 16×16, the third mode is a Mode 16×8 or Mode 8×16, and the fourth mode is a Mode 8×8.

Further, the motion mode of each macro block includes an inter mode and an intra mode. Herein, the inter mode performs compression based on the relationship between the current frame and the previous frame and the intra mode performs compression based on the relationship within the current frame, which can be derived from those skilled in the art.

Meanwhile, prior to step S100, the motion vector for the motion mode of the base layer is up sampled twice to first perform the first mode or the second mode that are the motion modes for the macro block in the enhancement layer by applying to the motion vector of the enhancement layer.

Herein, the first mode or the second mode, that is, the SKIP mode or Mode 16×16 relatively increases generation in the frequency as compared to other modes, but when the processing consumption time are relatively small and the prediction is wrong, have a large effect on the image quality and should thus be performed regardless of the mode.

Moreover, it is preferable that the intra mode is further performed after step 400. The performance time of the intra mode is relatively short as compared to the inter mode and the generation frequency is considerably small and should thus be performed regardless of the mode.

Figure 6:
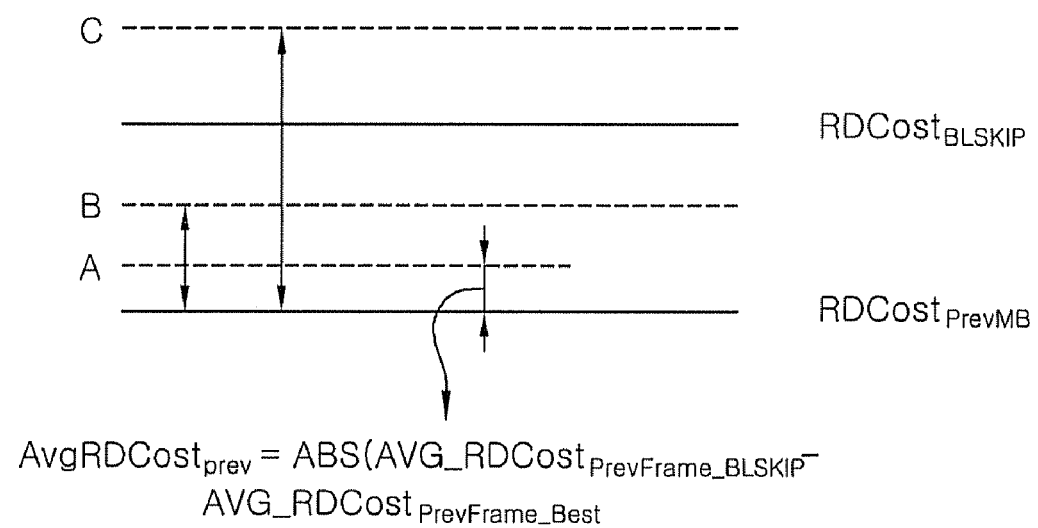
FIG. 6 is an exemplary diagram showing the relationship between a final bitrate-distortion cost and a speed parameter K according to the present invention.
Figure 7:
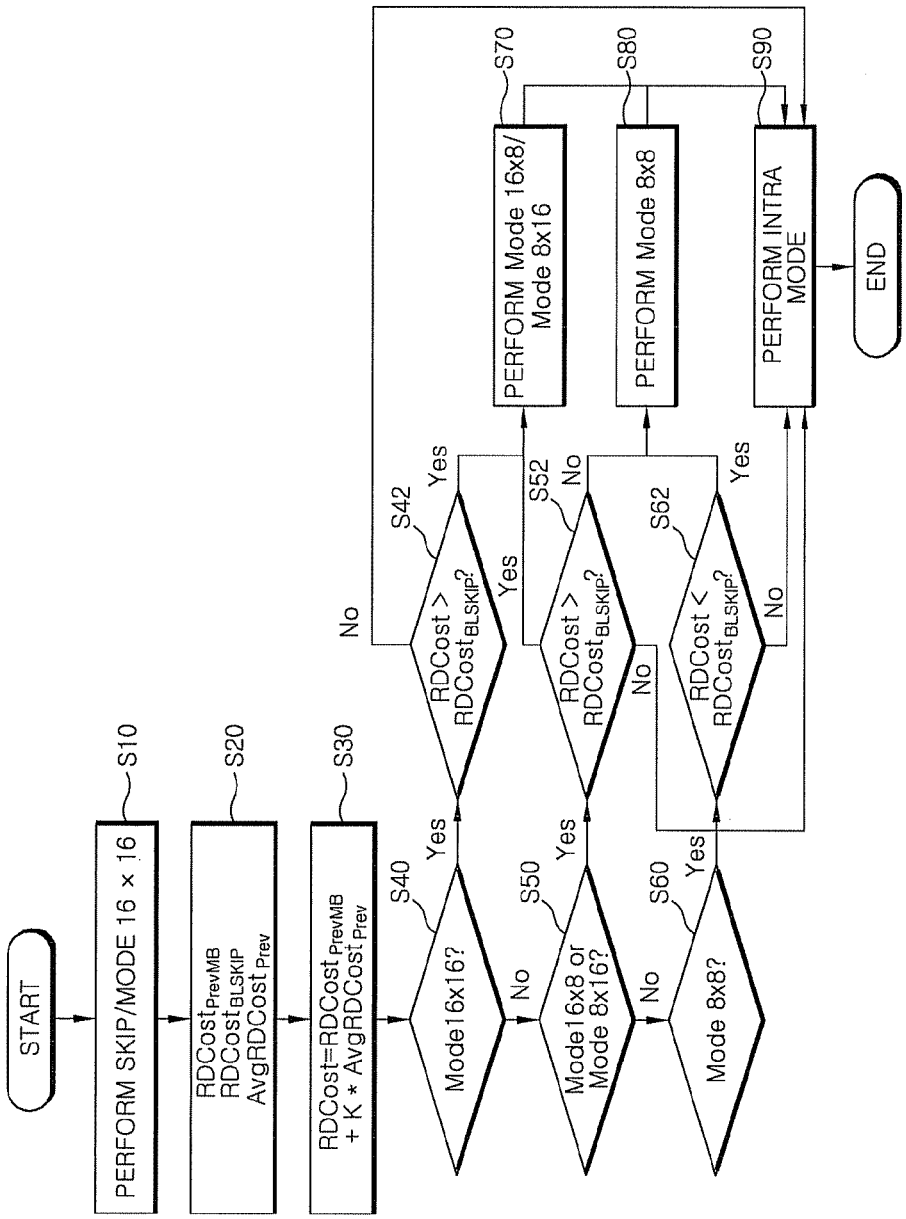
FIG. 7 is a flowchart showing a determination flow of motion modes of an enhancement layer using a bitrate-distortion cost according to motion modes of a base layer according to the present invention.

FIG. 6 is an exemplary diagram showing the relationship between the final bitrate-distortion cost and the speed parameter K according to the present invention and FIG. 7 is a flowchart showing the determination flow of the motion mode of the enhancement layer using the bitrate-distortion cost according to the motion mode of the base layer according to the present invention.

Referring to FIG. 6, the present invention adaptively varies the determination of the motion mode for the current macro block of the enhancement layer according to the value of the speed parameter K. In other words, as described above, when the final bitrate-distortion cost for the previous macro block is calculated by performing the correction by the correction value to reflect the relationship between the bitrate-distortion cost for the previous macro block and the previous frame t−1, a case where the foregoing Equations 1 and 2 are used as an example.

Herein, when the speed parameter K is "0" in the foregoing Equation 2, the comparison is simplified according to the bitrate-distortion cost between the previous macro block and the current macro block in the current frame.

In addition, reference numeral A in the drawings represents the final bitrate-distortion cost when the speed parameter K is 1 in the foregoing Equation 2.

Moreover, reference numeral B in the drawings represents a case where the speed parameter K is set so that the final bitrate-distortion cost is smaller than the bitrate-distortion cost of the current macro block in the foregoing Equation 2.

Meanwhile, reference numeral C in the drawings represents a case where the speed parameter K is set so that the final bitrate-distortion cost is larger than the bitrate-distortion cost of the current macro block in the foregoing Equation 2.

As described above, the bitrate-distortion cost adaptively varies to the speed parameter K. If the value of the speed parameter K becomes large, many motion modes to be performed in the macro block of the enhancement layer are removed, such that the fast encoding speed can be obtained, but the image quality of the frame or the increase in bit rate exhibit as the opposite result. Even if the value of the speed parameter K is small, and the internet speed improvement is reduced, but the deterioration of the image quality or the increase in bitrate little occurs.

Referring to FIG. 7, the fast encoding method of the enhancement layer using the bitrate-distortion cost in the SVC according to the embodiment of the present invention will be described through the experimental example.

Experimental Example 1

Case of RDCost>RDCost$_{BLSKIP}$ (Case of C in FIG. 4)

First, as described above, the SKIP mode or Mode 16×16 relatively increases generation in the frequency as compared to other modes, but when the processing consumption time are relatively small and the prediction is wrong, negatively affects the image quality and thus, should first be performed regardless of the mode (S10).

Next, the bitrate-distortion cost (for example, RDCost$_{BLSKIP}$) is obtained by applying the optimal motion mode and motion vector for the current macro block of the base layer in the current frame t to the enhancement layer. Thereafter, the bitrate-distortion cost (for example, RDCost$_{PrevMB}$) corresponding to the optimal motion mode obtained in the previous macro block (previous MB) based on the reference of the current macro block (current MB) that is a relative value for comparison is brought (S20).

Then, the foregoing bitrate-distortion costs are calculated according to the foregoing Equations 1 and 2 (S30). In other words, the final bitrate-distortion cost is calculated by applying the correction value to correct the bitrate-distortion cost (for example, RDCost$_{PrevMB}$) corresponding to the optimal motion mode obtained in the previous macro block (previous MB).

Next, the bitrate-distortion cost and the final bitrate-distortion cost for the current macro block corresponding to the motion mode of the macro block of the basic block are compared with each other and the motion mode that will be removed from the enhancement layer is selected according to the comparison result (S40 to S80).

For example, the motion mode of the macro block of the base layer is Mode 16×16 (S40) and if RDCost>RDCost$_{BLSKIP}$ (S42) occurs, Mode 16×8/Mode 8×16 is performed and other motion modes are removed (S70). Further, the motion mode of the macro block of the base layer is Mode 16×8/Mode 8×16 (S50) and if RDCost>RDCost$_{BLSKIP}$ (S52) occurs, Mode 16×8/Mode 8×16 is performed and other motion modes are removed (S70). Furthermore, the motion mode of the macro block of the base layer is Mode 8×8 (S60) and if RDCost<RDCost$_{BLSKIP}$ (S62), Mode 8×8 is performed and other motion modes are removed (S80).

Arranging this with reference to FIG. 8A, since the comparison result is RDCost>RDCost$_{BLSKIP}$, only "o" portion is performed and other unnecessary motion modes are removed. In other words, when the base layer is Mode 16×16 or Mode 16×8/Mode 8×16, Mode 8×8 is not performed and when the base layer is Mode 8×8, Mode 16×8/Mode 8×16 and Mode 8×8 are removed and only the SKIP or Mode 16×16 is performed.

Embodiment 2

Case of RDCost<RDCost$_{BLSKIP}$ (Case of B and A in FIG. 4)

As the result that the process is performed in the same way as the foregoing Embodiment 1, if Mode 16×8/Mode 8×16 is removed regardless of the motion mode of the base layer, when only the base layer is Mode 8×8, only Mode 8×8 is performed. Therefore, the processor usage of the encoder is considerably degraded.

As described above, with the present invention, the motion information of the lower layer of the current frame and the motion information of the enhancement layer of the previous frame are effectively extracted from the scalable video codec having a multilayer structure, such that many of the motion modes to be performed in the enhancement layer are removed, making it possible to obtain fast encoding performance speed.

The foregoing embodiment of the present invention will be described based on an example of determining the motion mode of the current macro block of the enhancement layer, but can be applied to even in the case where the inter mode and other modes (for example, BLSKIP mode etc.) are performed, which can be easily appreciated by those skilled in the art.

Accordingly, although the preferred embodiments disclosed in the present invention are shown and described, the present invention is not limited to the foregoing specific embodiments. Many changes and modifications within the scope of the present invention may be made by those skilled in the art without departing from the spirit thereof and the invention includes all such modifications.

What is claimed is:

1. A method of fast mode decision of an enhancement layer using a bitrate-distortion cost in an SVC (Scalable Video Coding) encoder, comprising:
a first step of calculating a bitrate-distortion cost for a current macro block and a bitrate-distortion cost for a previous macro-block of the current macro block of the enhancement layer based on an optimal motion mode and a motion vector for a macro block of a base layer of a current frame;
a second step of correcting the bitrate-distortion cost for the previous macro block calculated at the first step by a correction value for reflecting the relationship with the previous frame to calculate a final bitrate-distortion cost for the previous macro block; and
a third step of comparing the bitrate-distortion cost for the current macro block calculated at the first step with the final bitrate-distortion cost calculated at the second step and selecting motion modes that will be removed from the current macro block according to the comparison result.

2. The method of fast mode decision of an enhancement layer using a bitrate-distortion cost in an SVC encoder according to claim 1, wherein the second step includes:
b-1) calculating a first correction value obtained by averaging the bitrate-distortion costs for all the macro blocks of the enhancement layer derived based on the motion modes and motion vectors for the macro block of the base layer of the previous frame;

b-2) calculating a second correction value obtained by averaging the bitrate-distortion costs derived based on the optimal motion mode and motion vector for the macro block of the enhancement layer of the previous frame; and c) calculating the final bitrate-distortion cost based on the bitrate-distortion cost for the previous macro block calculated at the first step and the first correction value and the second correction value calculated at steps b-1) and b-2).

3. The method of fast mode decision of an enhancement layer using a bitrate-distortion cost in an SVC encoder according to claim 2, wherein step c) includes:

c-1) calculating the correction values from an absolute value of the difference between the first correction value calculated at step b-1) and a second correction value calculated at step b-2); and c-2) summing the bitrate-distortion cost for the current macro block calculated at the first step and the correction value calculated at step c-1) to calculate the final bitrate-distortion cost.

4. The method of fast mode decision of an enhancement layer using a bitrate-distortion cost in an SVC encoder according to claim 3, wherein the final bitrate-distortion cost at step c-2) varies depending on a speed parameter K to determine the deterioration of image quality and the increase in bitrate over processing time.

5. The method of fast mode decision of an enhancement layer using a bitrate-distortion cost in an SVC encoder according to claim 1, wherein the third step selects the motion modes that will be removed from the macro block of the enhancement layer of the current frame according to the optimal motion mode for the macro block of the base layer of the current frame.

6. The method of fast mode decision of an enhancement layer using a bitrate-distortion cost in an SVC encoder according to claim 1, wherein the motion modes of each macro block include at least one of a skip mode, which is a first mode, Mode 16×16, which is a second mode, Mode 16×8 or Mode 8×16, which is a third mode, and Mode 8×8, which is a fourth mode, the method further includes:
prior to the first step,
first performing the first mode and the second mode since the time occupation rate of the first mode and the second mode of the motion modes for the current macro block of the enhancement layer based on the motion modes and motion vectors for the optimal macro block of the base layer of the current frame.

7. The method of fast mode decision of an enhancement layer using a bitrate-distortion cost in an SVC encoder according to claim 1, wherein the motion modes of each macro block include an inter mode that performs the compression based on the relationship between the current frame and the previous frame and an intra mode that performs the compression based on the relationship within the current frame, the method further includes:
after the third step,
performing the intra mode for the current macro block of the enhancement layer of the current frame.

8. The method of fast mode decision of an enhancement layer using a bitrate-distortion cost in an SVC encoder according to claim 1, wherein the motion modes of each macro block include at least one of the skip mode, which is a first mode, Mode 16×16, which is a second mode, Mode 16×8 or Mode 8×16, which is a third mode, and Mode 8×8, which that is a fourth mode.

9. The method of fast mode decision of an enhancement layer using a bitrate-distortion cost in an SVC encoder according to claim 8, wherein the third step performs the third mode of the motion modes for the current macro block of the enhancement layer of the current frame if the optimal motion mode for the macro block of the base layer of the current frame is the first mode and the bitrate-distortion cost for the current macro block calculated at the first step is larger than or equal to the final bitrate-distortion cost calculated at the second step.

10. The method of fast mode decision of an enhancement layer using a bitrate-distortion cost in an SVC encoder according to claim 8, wherein the third step performs the third mode of the motion modes for the current macro block of the enhancement layer of the current frame if the optimal motion mode for the macro block of the base layer of the current frame is the second mode and the bitrate-distortion cost for the current macro block calculated at the first step is larger than or equal to the final bitrate-distortion cost calculated at the second step.

11. The method of fast mode decision of an enhancement layer using a bitrate-distortion cost in an SVC encoder according to claim 8, wherein, the third step performs modes except for the third mode and the fourth mode of the motion modes for the current macro block of the enhancement layer of the current frame if the optimal motion mode for the macro block of the base layer of the current frame is the third mode and the bitrate-distortion cost for the current macro block calculated at the first step is larger than or equal to the final bitrate-distortion cost calculated at the second step.

12. The method of fast mode decision of an enhancement layer using a bitrate-distortion cost in an SVC encoder according to claim 8, wherein the third step performs the third mode of the motion modes for the current macro block of the enhancement layer of the current frame if the optimal motion mode for the macro block of the base layer of the current frame is the first mode and the bitrate-distortion cost for the current macro block calculated at the first step is less than or equal to the final bitrate-distortion cost calculated at the second step.

13. The method of fast mode decision of an enhancement layer using a bitrate-distortion cost in an SVC encoder according to claim 8, wherein the third step performs the fourth mode of the motion modes for the current macro block of the enhancement layer of the current frame if the optimal motion mode for the macro block of the base layer of the current frame is the second mode and the bitrate-distortion cost for the current macro block calculated at the first step is less than or equal to the final bitrate-distortion cost calculated at the second step.

14. The method of fast mode decision of an enhancement layer using a bitrate-distortion cost in an SVC encoder according to claim 8, wherein the third step performs the fourth mode of the motion modes for the current macro block of the enhancement layer of the current frame if the optimal motion mode for the macro block of the base layer of the current frame is the third mode and the bitrate-distortion cost for the current macro block calculated at the first step is less than or equal to the final bitrate-distortion cost calculated at the second step.

* * * * *